(12) United States Patent
Bancroft et al.

(10) Patent No.: US 7,705,229 B2
(45) Date of Patent: Apr. 27, 2010

(54) METHOD, APPARATUS AND PROGRAMS FOR TEACHING AND COMPOSING MUSIC

(75) Inventors: Thomas Peter Bancroft, Midlothian (GB); Philip James Bancroft, Edinburgh (GB)

(73) Assignee: Caber Enterprises Ltd., Musselburgh (GB)

( * ) Notice: Subject to any disclaimer, the term of this patent is extended or adjusted under 35 U.S.C. 154(b) by 365 days.

(21) Appl. No.: 10/476,865

(22) PCT Filed: May 7, 2002

(86) PCT No.: PCT/GB02/02052

§ 371 (c)(1),
(2), (4) Date: Apr. 29, 2004

(87) PCT Pub. No.: WO02/093531

PCT Pub. Date: Nov. 21, 2002

(65) Prior Publication Data

US 2004/0173082 A1     Sep. 9, 2004

(30) Foreign Application Priority Data

May 4, 2001 (GB) .................................. 0111155.8

(51) Int. Cl.
*A63H 5/00* (2006.01)
*G04B 13/00* (2006.01)
*G10H 7/00* (2006.01)

(52) U.S. Cl. ...................................... 84/609; 84/470 R
(58) Field of Classification Search .................. 84/609, 84/612, 470 R
See application file for complete search history.

(56) References Cited

U.S. PATENT DOCUMENTS

| 4,307,645 | A | | 12/1981 | Rauchi |
| 5,252,772 | A | | 10/1993 | Wright |
| 5,394,784 | A | | 3/1995 | Pierce et al. |
| 5,544,562 | A | | 8/1996 | Jeon |
| 5,827,071 | A | | 10/1998 | Sorensen et al. |
| 6,066,791 | A | | 5/2000 | Renard et al. |
| 6,075,193 | A | * | 6/2000 | Aoki et al. ..................... 84/609 |
| 6,143,971 | A | * | 11/2000 | Aoki et al. ..................... 84/609 |

* cited by examiner

*Primary Examiner*—Jeffrey Donels
(74) *Attorney, Agent, or Firm*—K&L Gates LLP

(57) ABSTRACT

A method and apparatus for the construction and teaching of music is described. The method involves a user following a supported sequence of tasks that guide their creativity in order to construct a musical Arrangement. The musical Arrangement constructed from building blocks comprising notes, Ideas, Phrases and a Song Form Template. The described method allows for the concepts such as rhythm, chords, harmony, pitch, repetition, variation, resolution, and phrase structure, that are normally hidden within a final composition to the systematically introduced to a user. Development of keyboard apparatus, a mobile phone environment and related computer software allows for automation of the process for constructing and teaching of music.

20 Claims, 7 Drawing Sheets

Stage 1: Select from a limited number of 'Notes' and build Ideas.

Notes are ordered into sequences of a specific number of notes, referred to as Ideas.

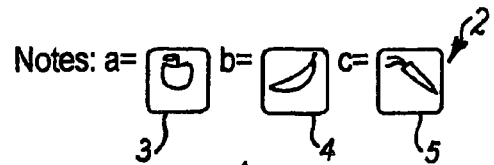

Stage 2: Select from a limited number of 'Ideas' and build Phrases.

Create a small number of short sequences of Ideas creating what is termed Phrases.

Stage 3: Select from a limited number of 'Phrases' and build Song Form.

e.g. A Song Form of sequence A A B A

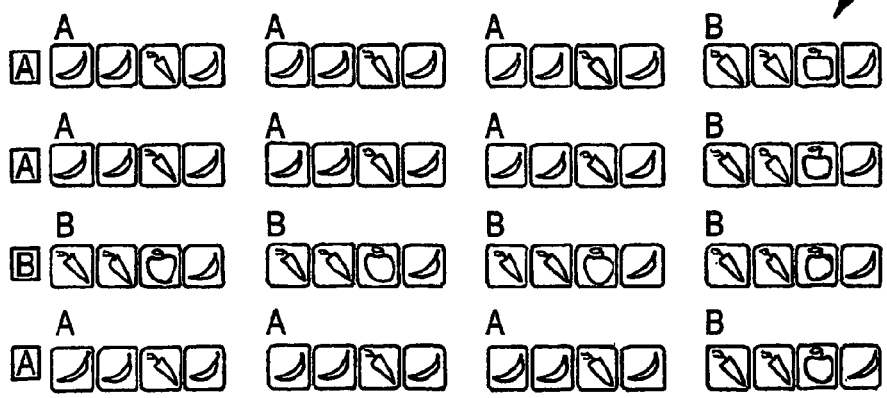

Fig.1

Stage 1: Alter a previously composed Idea, so it remains similar to original Idea, but is different.
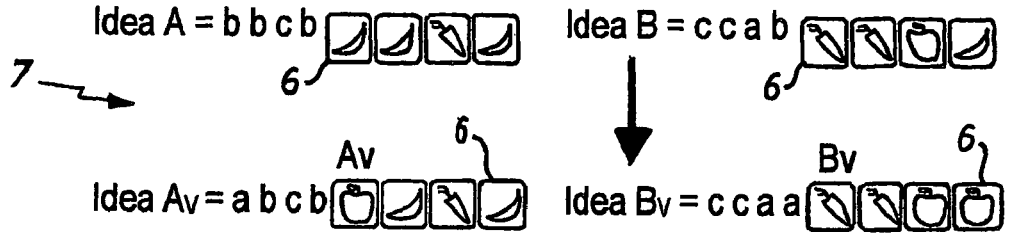
Stage 2: Compose Resolution Ideas, whereby the Idea is shortened, to produce a sense of punctuation. Always used as the last Idea in a Phrase.
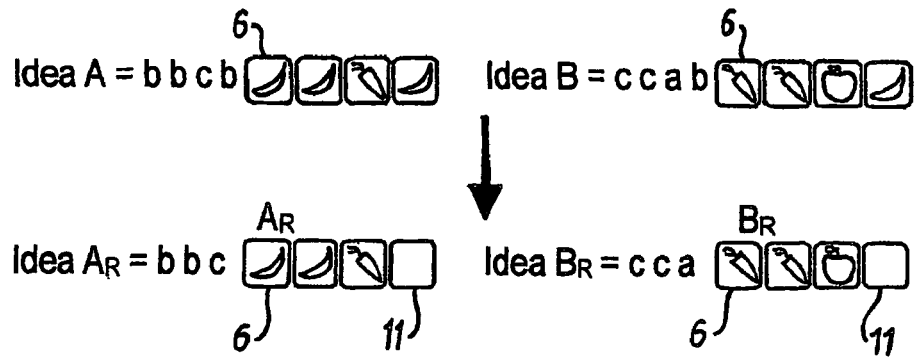
Stage 3: Select where to use Variation and Resolution Ideas in Song Form already composed.
e.g.
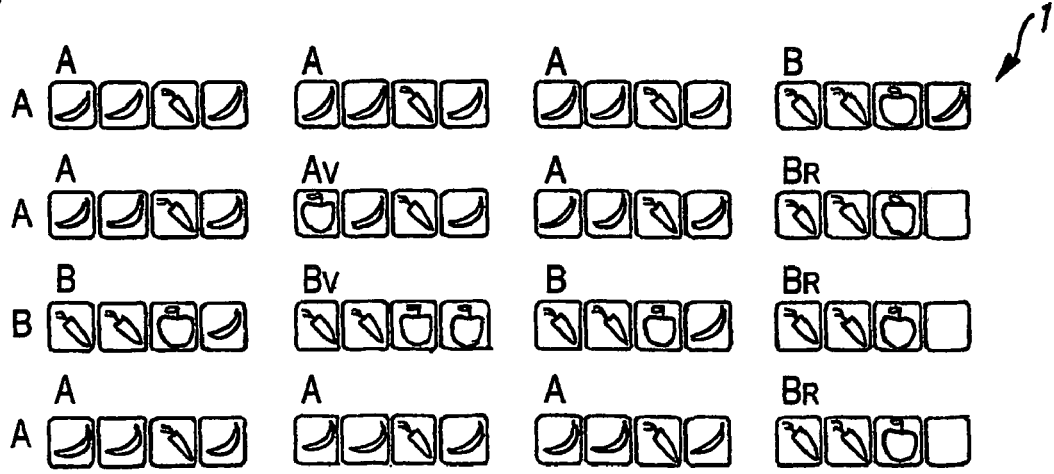
FIG. 2

Stage 1: Idea and Phrase structure preset, or decided by previous compositional activities, with purely rhythmic sub-units.

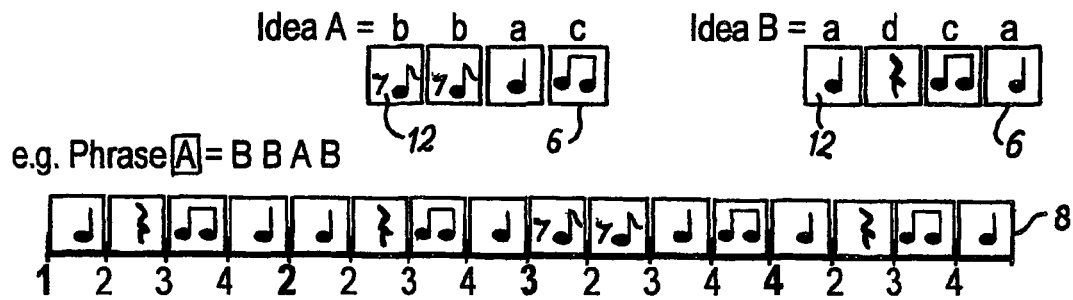

e.g. Phrase [A] = B B A B

Stage 2: Choose relative pitch information for each 'Note'.
For chords- Choose either Root- 1, Third- 3, Fifth- 5, or Seventh- 7.
For Scales choose degree of scale e.g. 1-7 for C major scale.

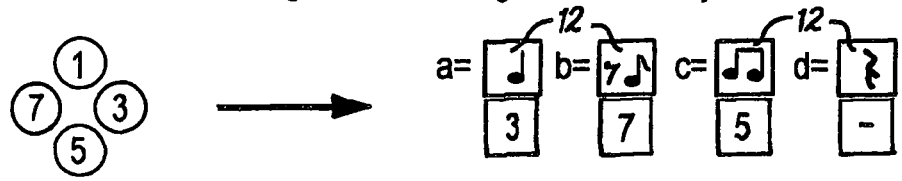

Stage 3: Relate relative pitch information to preset or pre-composed harmonic background sequence.

e.g. Phrase [A]

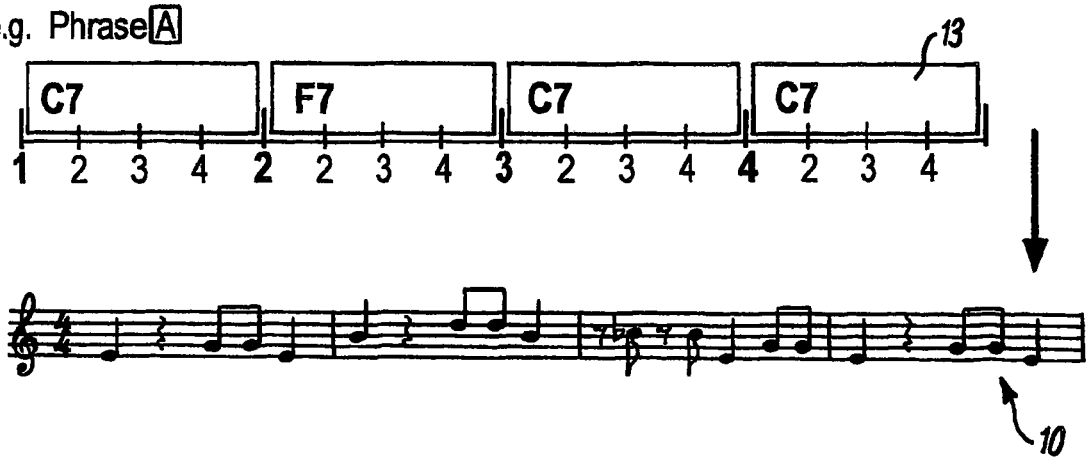

Stage 4: Do stages 1-3 for a small number of phrases e.g. 2-3.
Construct Song Form from sequencing Phrases- as Compositional Model #1.

*FIG. 3*

Stage 1: Idea and Phrase structure preset, or decided by previous compositional activities, with purely rhythmic sub-units.

Idea A = b  b  a  c         Idea B = a  d  c  a

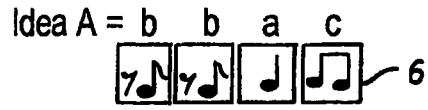 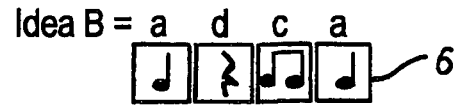

e.g. Phrase A = B B A B

Stage 2: Choose relative pitch information for each 'Idea'.
For chords- Choose either Root- 1, Third- 3, Fifth- 5, or Seventh- 7.
For Scales choose degree of scale e.g. 1-7 for C major scale.

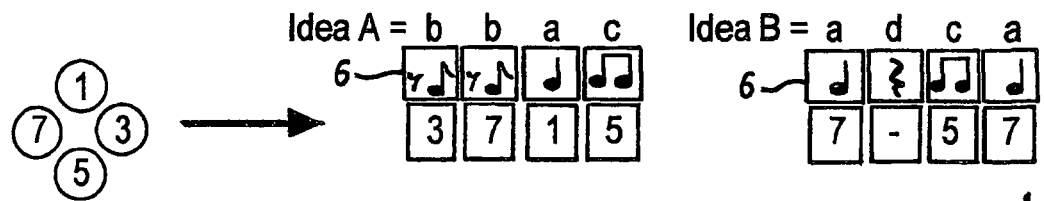

Stage 3: Relate relative pitch information to preset or pre-composed harmonic background sequence.

e.g. Phrase A

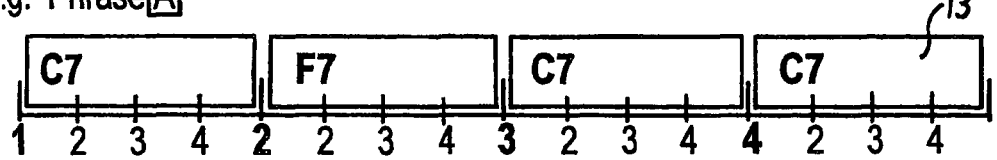

Stage 4: Do stages 1-3 for a small number of phrases e.g. 2-3.
Construct Song Form from sequencing Phrases- as Compositional Model #1.

*Fig. 4*

METHOD, APPARATUS AND PROGRAMS FOR TEACHING AND COMPOSING MUSIC

CROSS-REFERENCE TO RELATED APPLICATIONS

This application is the national phase of International (PCT) Patent Application Serial No. PCT/GB02/02052, filed May 7, 2002, published under PCT Article 21(2) in English, which claims priority to and the benefit of British Patent Application No. 0111155.8, filed May 4, 2001, the disclosures of which are incorporated herein by reference.

The present invention relates to the field of musical teaching aids. More specifically it relates to a method and apparatus for constructing and teaching music specifically tailored to a user's musical ability.

The composing of a piece of music at first sight appears a most daunting task especially to a person who is new to the art. Concepts such as rhythm, chords, harmony, pitch, repetition, variation, resolution, and phrase structure etc., can be hidden within the final composition and so can be difficult for a person new to the art to grasp. If the process of composing music can be simplified a student would gain a better appreciation of these concepts so enhancing their understanding, skill and enjoyment of music and composition.

Musical instruments generally comprise a plurality of note playing means. Common note playing means are the keys found on keyboard instruments such as clavichords, harpsichords, organs, pianos and synthesisers. Keyboard instruments are an ideal way of introducing music to a person who is new to the art and so provide an ideal forum for teaching about the structure of music. Typically a piano keyboard comprises a plurality of white and black keys. Each key, when pressed, produces a corresponding tone or note. The white keys correspond to what is commonly known as diatonic tones or notes while the black keys correspond to what are known as the chromatic tones or notes. These keys are arranged in octaves such that each octave contains the same set of tones or notes. Their pitch distinguishes the same tones or notes of different octaves from each other.

Various keyboard interfaces have been employed in an attempt to teach students about the composition of music. For example U.S. Pat. No. 5,011,412 teaches of a keyboard with removable keys, wherein musical tone generation for a given key is provided in response to the correct placement of the key in its corresponding key slot.

An ideal interface for the teaching of music with keyboards is a computer. U.S. Pat. No. 4,655,117 teaches of a method whereby a standard computer keyboard is converted via computer software to act as a musical keyboard. However, standard computer keyboards are designed to aid typing so the key arrangement as taught in this Patent is undesirable for developing a user's ability to play music.

Alternatively, the U.S. Pat. No. 4,352,313 teaches of a piano-type keyboard unit, that is adapted to fasten onto a standard keyboard, and software that converts a computer keyboard to be a musical keyboard. Such keyboards tend to be cumbersome still being restricted by the keyboard designed to aid typing. Additionally such add on keyboard designs require knowledge of the layout of the computer keyboards. An obvious problem in these teachings is the fact that although keyboards are standard in terms of their content, they are not of standard dimensions. For instance ergonomic keyboards are becoming popular alternatives for use with computer.

Further musical instrument and computer interface technology is known in the art whereby instruments are attached directly to the computer. Such systems require additional hardware in the form of a Musical Instrument Digital Interface (MIDI) and software in order to provide a working interface.

As an initial point to note reference to a computer herein include computers commonly known in the art as personal computers, laptop computers and hand-held computers.

It is an object of at least one aspect of the present invention to provide a method for constructing music that requires a user to construct a musical Arrangement, from user defined units, by following a supported sequence of tasks.

It is a further object of at least one aspect of the present invention to provide a medium within which the method of constructing music is automated.

It is a further object of at least one aspect of the present invention to provide a musical instrument that can be connected directly to a computer via its normal keyboard connection means so as to aid in the method of constructing music.

According to a first aspect of the present invention there is provided a method for constructing a musical Arrangement, the method comprising the steps of:
1) Constructing an Idea Set from a note set;
2) Constructing a Phrase Set from the Idea Set;
3) Constructing a Song Form Template from the Phrase Set; and
4) Choosing a number of repetitions of the Song Form Template.

Most preferably the note set comprises a predetermined number of notes chosen from a group comprising conventional musical notes with a rhythmic and pitch component, purely rhythmic sub-units, words, animal noises, a rest and harmonic structures.

Preferably the Idea Set comprises a number of Ideas wherein each Idea comprises an ordered sequences of notes selected from the note set.

Preferably the Phrase Set comprises a number of Phrases wherein each Phrase comprises an ordered sequences of Ideas selected from the Idea Set.

Preferably the Song Form Template comprises an ordered sequences of Phrases selected from the Phrase Set.

Preferably the Song Form Template further comprises a background harmonic structure onto which the Ideas and Phrases are mapped.

Optionally the concept of Variation can be introduced to the Song Form Template by changing the pitch of part or all of an Idea, by changing the rhythm of part or all of an Idea, or by changing both the rhythm and pitch of part of an Idea and substituting the altered Idea within the Song Form Template.

Alternatively the concept of Variation can be introduced to the Song Form Template by substituting the altered Idea at the end of a Phrase which termed is Resolution.

Optionally the concept of pitch can be introduced to the Song Form Template by allocating relative pitch to the musical notes or harmonic structures within the note set wherein on mapping the Phrases onto the background harmonic structure the relative pitch is converted to actual pitch.

Alternatively the concept of pitch can be introduced to the Song Form Template by allocating relative pitch to the Ideas within the Idea Set wherein on mapping the Phrases onto the background harmonic structure the relative pitch is converted to actual pitch.

Alternatively the concept of pitch can be introduced to the Song Form Template by allocating relative pitch to the Phrases within the Phrase Set wherein on mapping the Phrases onto the background harmonic structure the relative pitch is converted to actual pitch.

Optionally the musical Arrangement further comprises a melodic composition for use as a bass line, a counter point line, or a harmony part, or a drum part wherein the melodic composition comprises a second Song Form Template.

Optionally the Song Form Template further comprises an introduction.

Optionally the Song Form Template further comprises an interlude.

According to a second aspect of the present invention there is provided an input means comprising a plurality of segments, an electric signal generating means and a plug, wherein the plug allows the input means to be connected to a computer via a standard keyboard port, such that each segment produces an electrical output that corresponds to an individual musical note.

Preferably the input means is a musical keyboard, although any adapted musical instrument may be employed.

Most preferably each segment corresponds to a key on the musical keyboard.

Optionally the musical keyboard comprises one or more dividers that divide the keys into one or more user sections.

Preferably each user section comprises keys that can play at the same pitch.

Optionally each user section comprises a plurality of keys selected from the group comprising parallelograms, triangles, circles, stars or any other suitable geometrical shape.

According to a third aspect of the present invention there is provided a computer program for a musical input means comprising program instructions for:

1) Mapping the output signals of the input means so as to replicate those of a standard computer keyboard.
2) Converting the output signals to produce a set of musical scale of notes or sounds According to a fourth aspect of the present invention there is provided apparatus comprising an input means, a recording and processing means, and an output means, wherein a predetermined information template is stored within the recording and processing means and displayed on the output means, such that it may be compared against data entered into the recording and processing means from the input means.

Preferably information is entered into the recording and processing means from the input means in accordance with the computer program of the third aspect of the present invention.

Preferably the input means is a musical instrument. Most preferably the musical instrument is a keyboard as defined in the second aspect of the present invention.

Preferably the recording and processing means is a computer. Preferably the output means is a computer monitor.

Most preferably the predetermined information template is a musical Arrangement formed in accordance with the method as described in the first aspect of the present invention.

Preferably the data entered into the recording and processing means by a user via the keyboard is analytically compared to the musical Arrangement for accuracy and timing thereby providing a measure of the skill of reproduction of the musical Arrangement by the user.

Preferably the measurement of a users skill is displayed at the end of the reproduction of the musical Arrangement.

According to a fifth aspect of the present invention there is provided a computer program, when loaded into a computer, constitutes the processing means for creating and analysing the reproduction of a musical Arrangement by one or more users, comprising the program instructions of:

1) Selecting a number of users.
2) Selecting a number of notes to be employed within a note set.
3) Constructing a musical Arrangement from the method as defined in the first aspect of the present invention.
4) Requesting the user to play the Arrangement.
5) Calculating the accuracy with which the user performed the Arrangement.
6) Displaying an indication of user's accuracy.

Preferably the user chooses whether to construct the musical Arrangement manually or automatically.

Preferably the accuracy with which a user reproduces the information template comprises a measure of replication and timing.

According to a sixth aspect of the present invention there is provided a mobile phone comprising an input means, a recording and processing means, and an output means, wherein a predetermined information template is stored within the recording and processing means and displayed on the output means, such that it may be employed as a ring tone for the mobile phone.

Most preferably the predetermined information template is a musical Arrangement formed in accordance with the method as described in the first aspect of the present invention.

Preferably the input means comprises a keypad and a plurality of function keys employed to aid the construction of a particular musical Arrangement.

Preferably the output means comprises a display screen associated with the mobile phone.

Embodiments of the present invention will now be described, by way of example only, with reference to the accompanying drawings, in which:

FIG. 1 illustrates a method for constructing a Song Form Template;

FIG. 2 illustrates an alternative Song Form Template constructed using the method of FIG. 1;

FIG. 3 illustrates a more complex Song Form Template that employs the concept of pitch;

FIG. 4 illustrates an alternative method for introducing the concept of pitch to a Song Form Template;

Figure 5:
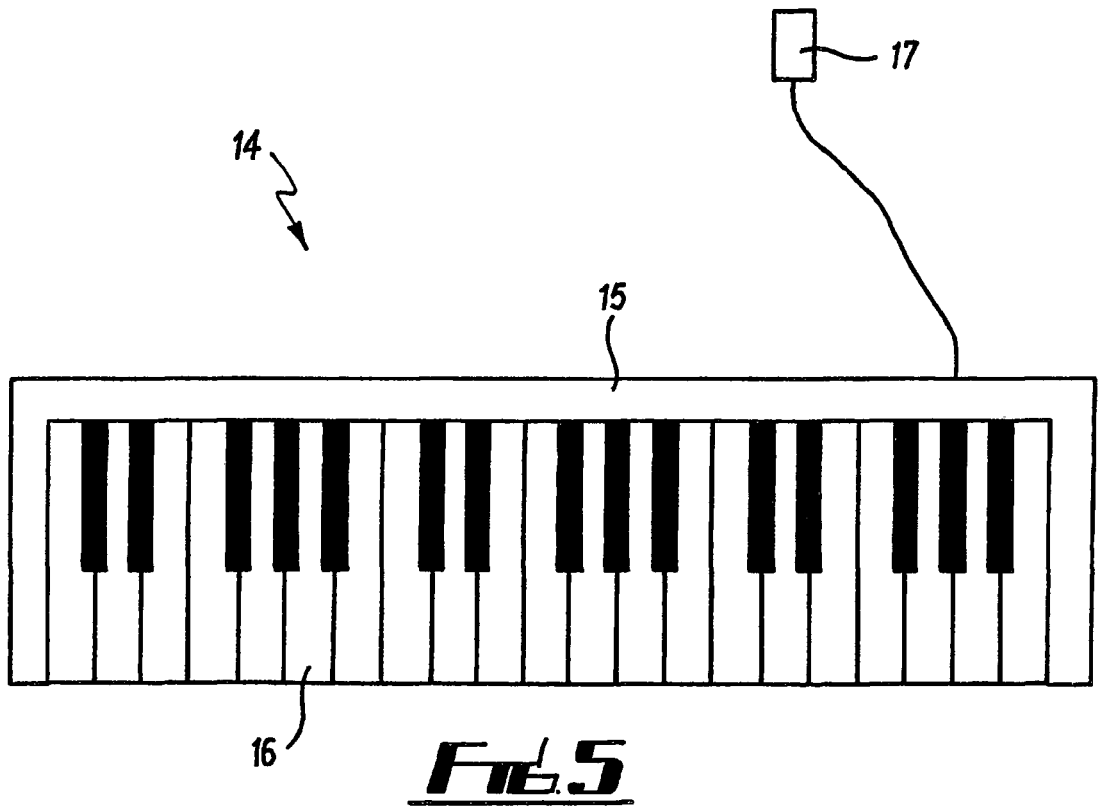
FIG. 5 illustrates a musical keyboard suitable for connection to a computer via a standard keyboard port.

FIG. 1 presents an illustration of the method for constructing and teaching of music in accordance with an aspect of the present invention. This method involves the development of a Song Form Template generally depicted at 1. The Song Form Template 1 comprises a sonic or musical composition that is built up through a series of stages of note selection where the notes are selected from a restricted note set 2.

Notes in this context refer to sonic building blocks usually lasting one or two beats. These sonic building blocks are grouped into note sets 2 of usually 3-5 notes, and can comprise: conventional musical notes, defined as a rhythmic value e.g. a crotchet, two quavers, a quaver rest followed by a quaver; a pitch e.g. D natural and in some cases a timbral quality e.g. a piano sound, a saxophone etc. Alternatively, the note set may comprise other types of sonic building blocks such as an animal noise e.g. Woof or a Miaow, or indeed may comprise a silent building block, relating to a rest in conventional musical notation. In other cases the said notes may also contain a relative measure of pitch by referring to the degree of a scale, defined by a number e.g. 1st degree, 2nd degree of the scale, or the interval of a chord, e.g. the root, third, fifth or seventh or ninth.

Alternatively, when the compositional process aims to construct a harmonic sequence, the note set in this context may refer to a set of harmonic structures, each built on a specific pitch, such as a triad, a chord or a scale e.g. C major triad, or harmonic structures, each built on a relative pitch, e.g. Dominant Seventh Chords built on the $1^{st}4^{th}$ or $5^{th}$ degree of a major scale—with the specific pitch being expressed when a parent key for that section of music is chosen. In this context, the Notes usually last for one bar or for half a bar, relative to the underlying background rhythmic structure.

In the example described in FIG. 1, Stage 1 comprises the selection of notes from a group of fruit and vegetable sounds, namely apple 3, banana 4 or carrot 5. These notes are then ordered into sequences of a specific number of notes. The length of such sequences may be selected by the user, or predetermined, and are typically 2, 3, 4, or 5 notes long. In this particular example the sequence level length is 4.

This level of structure is referred to as an Idea 6, and these Ideas 6 relate closely to the musical term the 'bar'. However, in an alternative embodiment an Idea 6 may be constructed to be smaller or larger than the underlying rhythmic structure of the music (the bar). Therefore, it may be that more than one Idea 6 may be positioned within one bar (where the Idea 6 is smaller than a bar), or an Idea 6 may be positioned in a way that it extends over more than one bar (where an Idea 6 is larger than a bar). The Ideas 6 may also be positioned so as to start at points in the bar other than on the first beat e.g. on the second beat.

Typically, a small number of Ideas 6 need to be constructed in order to form an Idea Set 7. FIG. 1 shows an Idea Set 7 comprising two different Ideas 6, labelled Idea A and Idea B, respectively.

Stage 2 of the method involves a selection being made from the Idea Set 7 in order to create a small number of short sequences of Ideas 6, each being termed a Phrase 8.

Such sequences may be constructed by the individual, or alternatively selected form a range of pre-composed Phrase sequences e.g. AABA, ABAB, where A refers to Idea A, and B refers to Idea B etc.

As with the Idea Set 7 a small number of Phrases 8 need to be constructed in order to form a Phrase Set 9. FIG. 1 shows a Phrase Set 9 comprising two different Phrases 8, labelled Phrase A and Phrase B, respectively.

In the present example the Ideas 6 relate identically to a music bar and a Phrase 8 is chosen to comprise four Ideas 6. However, in alternative embodiments where the Ideas 6 are not identical to bars, the Ideas 6 are sequenced such that they fit into a background rhythmic structure of typically four or eight bars. There is no requirement that the Ideas 6 are located so as to fill up the entire 4 or 8 bar structures, i.e. there may be spaces between the Ideas 6.

Stage 3 of the described method requires a user to select Phrases 8 from the Phrase Set 9 so as to create a small sequence of Phrases 8 referred to as the Song Form Template 1. As with Ideas 6, the user may construct their own sequences or select from an array of predetermined sequences.

By constructing the Song Form Template 1 in stages through the building of Ideas 6 from notes 3, 4, 5, the Phrases 8 from Ideas 6, and the Song Form Template 1 itself from Phrases 8 the user is able to define the length of the finished composition. The user may then specify how many times the Song Form Template 1 is to be repeated so creating a musical Arrangement 10. The user then attempts to perform Arrangement 10 on their musical instrument, for example on their keyboard instrument.

As the user becomes more skilled in the construction and performance of an Arrangement 10 more technically challenging features can be included within the Song Form Template 1. For example introductions, interludes constructed from sections of the Arrangement 10 or Variations.

FIG. 2 presents the incorporation of Variation into the Song Form Template 1 of FIG. 1. In general Variation involve taking the initial Song Form Template 1 structure or sequence, and changing certain parts in a limited way such that they remains similar to the original sequence or structure but exhibit a distinct character. As is known to those skilled in the art where a Variation is effected at the end of a Phrase 8 this Variation is termed a Resolution 11. A Resolution 11 serves to mark the end of the Phrase 8, as shown in the last Ideas 6 of some of the Phrases 8 within FIG. 2. Variations may however occur at any stage of the aforementioned process, but usually involve varying the structure at the level of Ideas 6.

Alternative forms of Variation known to those skilled in the art may also be readily incorporated into the aforementioned method for teaching and constructing music. In particular when the notes contain rhythmic and pitch information, Variation can relate to changing just the pitch of part or all of an Idea 6, or changing the rhythm of part or all of an Idea 6, or changing both the rhythm and pitch of part of an Idea 6. In this case, Resolution can involve adjusting the pitch of the last note in a Phrase 8 to the root of the underlying chord or scale. When the composition process involves constructing a harmonic sequence from notes that represent harmonic structures, Resolution can refer to returning to the chord built on the root of the parent key of that section of the music, at the end of a Phrase 8.

FIG. 3 illustrates how the concept of pitch can be introduced to a Song Form Template 1 constructed from a note set 2 comprising basic rhythmic sub-units 12. In this particular embodiment Stage 1 comprises the construction of Ideas 6 and Phrases 8 as previously described. Stage 2 then comprises allocating relative pitch information to the individual rhythmic sub-units 12 e.g. root, third, fifth or seventh as depicted by the corresponding numerals. Stage 3 then comprises the defining of a particular harmonic background sequence 13 suitable for mapping onto a particular Phrase 8. This harmonic background sequence 13 may itself be constructed by the earlier compositional method described above. Therefore, the mapping of the sub-units containing rhythmic and relative pitch information 12 into Ideas 6 and the Ideas 6 into the Phrases 8 results in the production of a Phrase 8 that illustrates both the concepts of rhythm and specific pitch. By repeating this process a Phrase Set 9 can be constructed from which a Song Form Template 1 can be produced as previously described.

In an alternative embodiment shown in FIG. 4 the concept of relative pitch is introduced at the level of the Ideas 6 rather than at the level of rhythmic sub-units 12. As with the method outlined in FIG. 3 a Phrase 8 is again constructed at Stage 1. However, Stage 2 now comprises the allocation of relative pitch information to an individual Idea 6. Therefore, repeating Stage 3 as before, results in a Phrase 8 that differs to that formed from following the method of FIG. 3 because of the alternative method of allocating pitch.

The effect of pitch variation can be further illustrated to a user by the allocation of relative pitch to the individual components within a particular rhythmic sub-unit 12. Carrying out the aforementioned mapping process would result in a third alternative Phrase 8 constructed from the same initial rhythmic sub-units 12.

In order to add a further level of complexity to the construction of a musical Arrangement 10 a user can repeat the above processes in order to write a separate melodic composition. This separate melodic composition can then be employed as a bass line or as a counterpoint, therefore allowing for the user to create more sophisticated Arrangements 10 or harmony parts, either by adapting the original compositional process (harmony parts) or following new compositional processes.

Following the above method allows a user to construct and alter a Song Form Template 1 and hence a musical Arrangement 10 on more than one level, with all the levels thereafter being combined. Thus, a user may follow one compositional process to compose a harmonic background sequence, a second to compose a rhythmic structure and a third to assign relative pitch values to the rhythmic structure. All three levels can then be combined to produce the end result.

It should be noted that the processes of Variation and Resolution 11 could occur independently or simultaneously in all of these processes. Furthermore, once this process has been completed, one individual element can be independently altered. Therefore, a composition comprising combined rhythmic and relative pitch can be mapped with a series of different underlying harmonic background sequences 13 so as to achieve different end results.

It should be noted that the use of sets usually containing a small number of choices at each level of the compositional process encourages a sense of unity throughout the whole composition, through the repetition of elements. This is a key educational principle for new composer to grasp. The process of introducing Variation allows the composer to create variety and interest in their composition while retaining unity.

The method for constructing and teaching music may be readily automated by processing the method as a computer program run on a computer. In order to aid the automation of this method a musical keyboard 14 has also been developed, as depicted in FIG. 5.

The musical keyboard 14 can be seen to comprise a main body 15, keys 16 covering three octaves of notes of a musical scale, and a keyboard plug 17. The keyboard plug 17 is designed so as to be compatible with a standard keyboard port on a computer (not shown).

Software employed by the computer results in each key 16 on the musical keyboard 14 being mapped to the standard output signal generated by a single key, or combination of keys, on a conventional keyboard. Therefore, when a key 16 is pressed on the musical keyboard 14 it generates a standard output that can then be processed by the computer software to generate a corresponding note.

In accordance with the method of constructing and teaching of music, described above, the given note could relate to a specific conventional musical note. Alternatively, it may relate to other specific sounds, such as an animal noises (e.g. Woof, Miaow), words, other more abstract sounds (e.g. Scat sounds such as diddley-bop), or a harmonic structure such as a triad, chord, scale or a mode.

Figure 6:
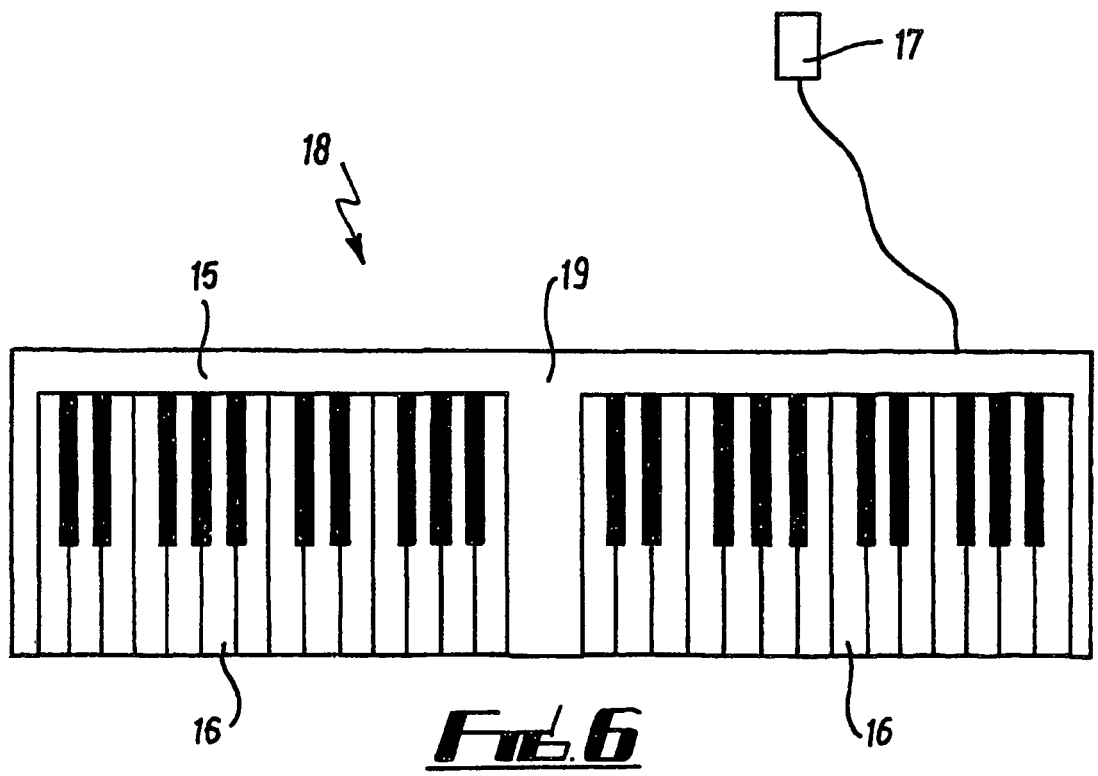
FIG. 6 illustrates an alternative embodiment of the musical keyboard of FIG. 5.

With reference to FIG. 6, an alternative embodiment of the musical keyboard is presented in the form of a dual keyboard 18. Here the keys 16 are divided into two sections by a divider 19 so as to allow two users to use the dual keyboard 18 simultaneously.

In a further alternative embodiment (not shown) the keyboard is divided into a multi-keyboard comprising groups of four or five coloured buttons, each of a different shape (e.g. a blue square, a red circle, a yellow triangle and a green star). Both the dual 18 and multi-keyboards increase the facility for two or more users to compete against each other while improving their musical skills using the method outlined below.

Figure 7:
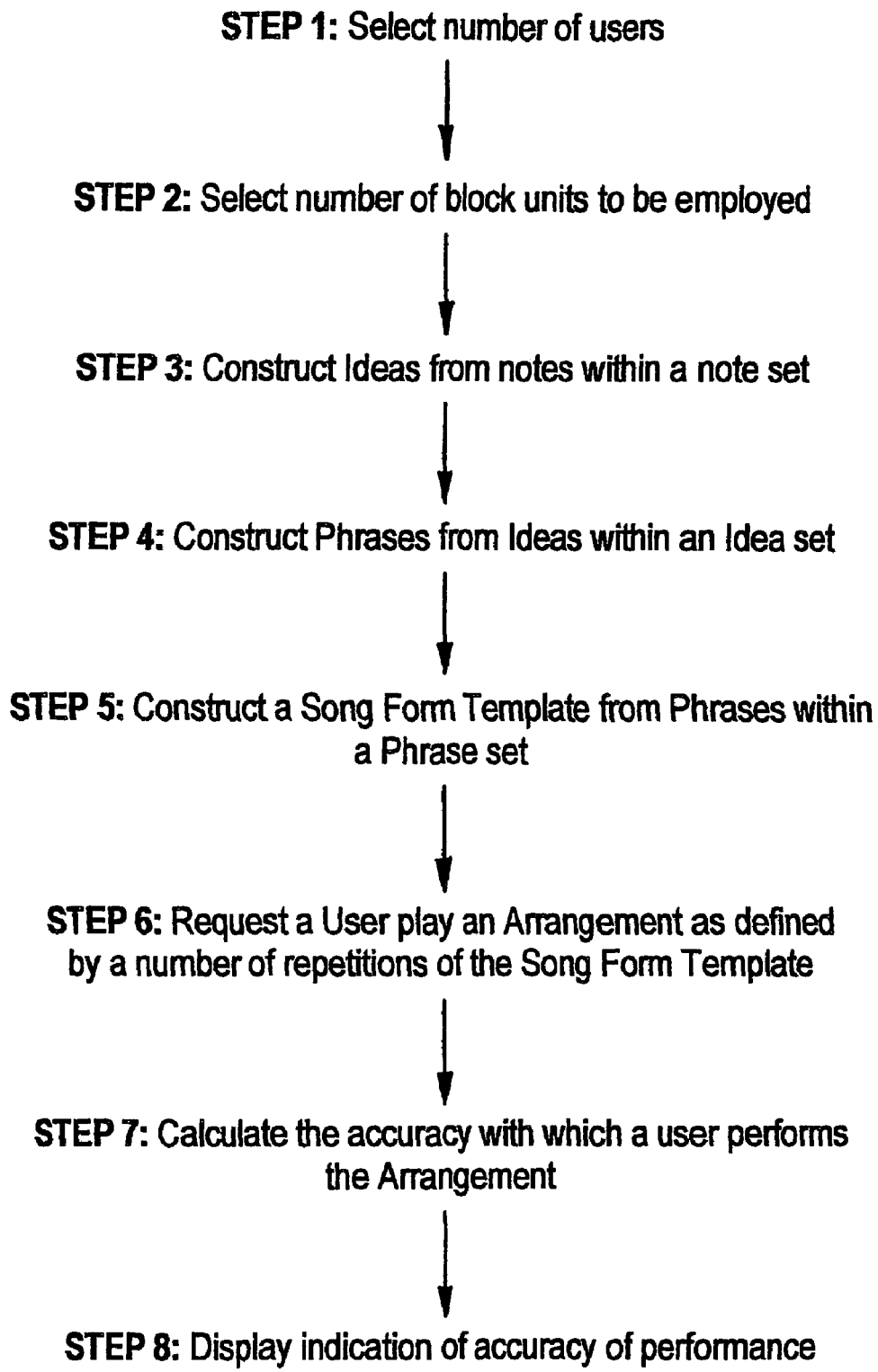
FIG. 7 illustrates a flow chart representation of the method for creating, and analysing the reproduction of, a Song Form Template.

For the musical keyboard 14 to be used as an aid to improve a user's musical skills, software is employed for receiving information from the keyboards 14 and 18 and for processing this information. FIG. 7 presents a flow chart of the instructions employed by the computer software. These instructions include:

1) Selecting the number of users.
2) Selecting the number of block units to be employed.
3) Constructing the Ideas from the notes within the notes set.
4) Constructing the Phrases from the Ideas within the Ideas Set.
5) Composing a Song Form Template from the Phrases within the Phrase Set.
6) Requesting the user to play an Arrangement as defined by the number of repetitions of the Song Form Template.
7) Calculating the accuracy with which the user performed the composition.
8) Displaying an indication of user's accuracy.

Step one of the above method further comprises selecting the number of notes within a notes set 2, the number of Ideas 6 within an Ideas Set 7 and the number of Phrases 8 within a Phrase Set 9 to be used.

Typically, steps one to four could be carried out automatically, particularly when the user is a musical novice employing simple sound building blocks. However as the user becomes more adept in their performance and skill these steps may be user generated allowing them to select from rhythmic sub-units, chords etc.

The user could then progress to selecting the relative pitch at which particular notes or Ideas 6 should be performed and to defining particular harmonic background sequences 13 for particular Phrases 8.

As previously described the note set 2 could be restricted to particular rhythms or underlying harmonic sequences. Typically these could comprise rhythms or underlying harmonic sequences found in particular styles of music. This would allow the user to develop their knowledge and skill of that style of music, for example Jazz and Blues, or a Jig and Reel in Traditional Celtic Music.

A further alternative would be that instead of performing musical notes the components of the individual bars could comprise animal sounds, thus making the invention more appealing to a younger user. Initially, younger users could learn to perform sequences using the multi keyboard, before progressing onto the musical keyboard. A yet further alternative would be to allow users to select fragments from well-known melodies, and use them as the notes or Ideas 6 for the compositional process. More abstract sounds can also be employed so creating atmospheric, thematic, or idiomatic compositions.

Once an Arrangement 10 has been created the user is then prompted to perform the piece of music on the musical keyboard 14. The accuracy with which a user is able to reproduce the Arrangement 10 is calculated as a function of expressing the correct sequence of notes or as a function of rhythmic accuracy of a user's expression of the Arrangement 10, or as a function of both. When non-conventional sounds are being used as sonic building blocks, the accuracy of the expression of the sequence of sounds and/or the rhythmic accuracy of the timing of expression of this sequence may be used to measure the accuracy of the user's performance.

By employing the dual keyboard 18, or the multi-keyboard, two or more users can simultaneously attempt to perform the same composition, or in sequence perform alternating sections of the same composition. Each user then receives an accuracy score, so adding an element of competition to their performance. Alternatively a second user may attempt to reproduce a musical Arrangement 10 as performed by the first user.

The computer software can also provide predetermined Song Form Templates 1 or that allow the various keyboards 14 and 18 to act as a forum for any array of other instruction methods. The software can perform a composition requiring the users to respond in turn by activating the appropriate keys on the keyboard 14 and 18. As the users progress, the Song Form Templates 1 become increasingly more complicated. When a user misses a note or rhythm, or plays a note at the wrong time, an error message or sound is activated. At the end of a composition an accuracy score for each user is again displayed.

A second environment where the method for constructing and teaching music may be readily automated is within mobile phones, and in particular within the field of creating personalised ring tones.

Figure 8:
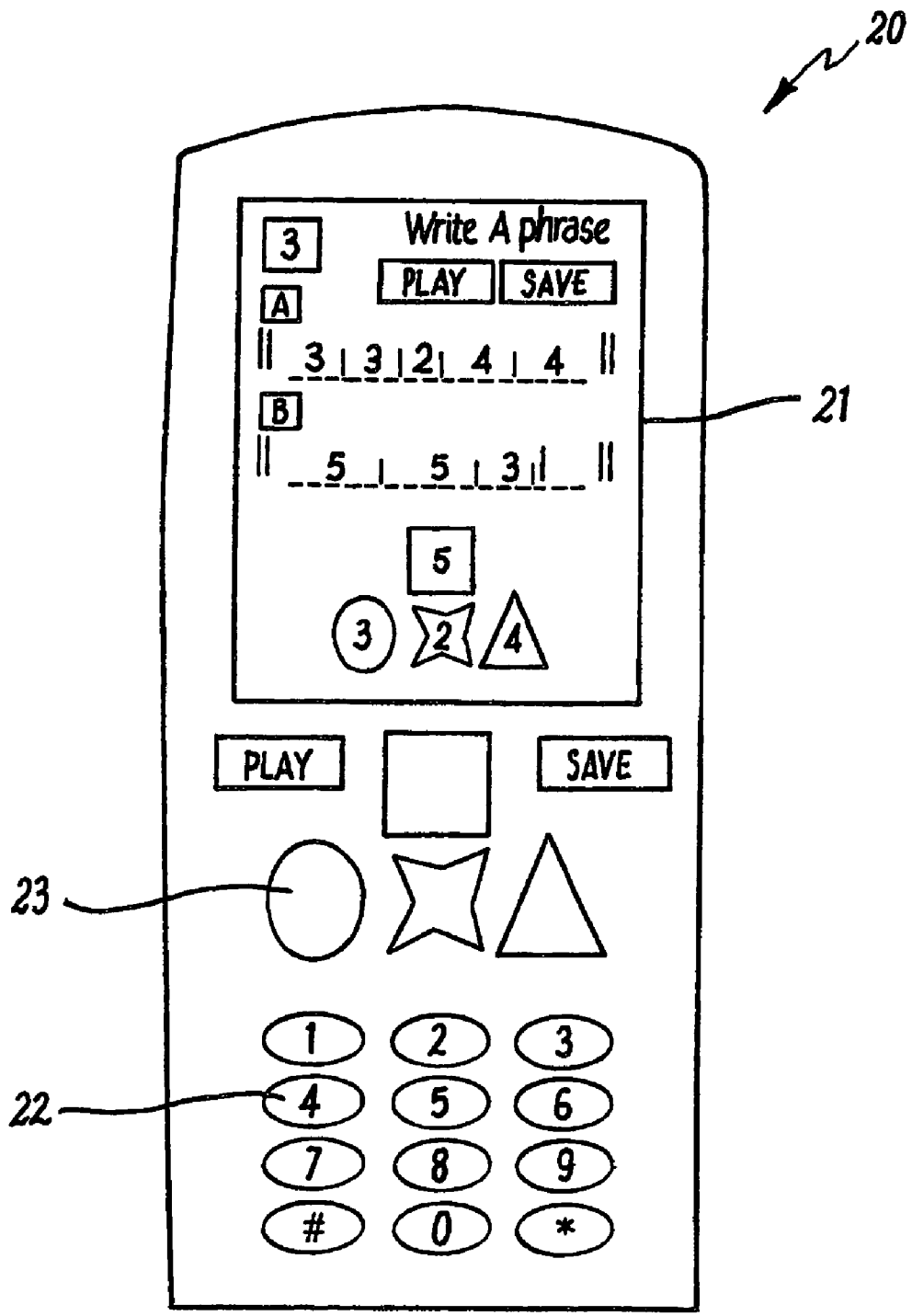
FIG. 8 illustrates a mobile phone suitable for automating the construction of a Song Form Template.

FIG. 8 presents an illustration of a mobile phone 20 suitable for automating the construction of a musical Arrangement 10 from user defined Song Form Templates 1. The mobile phone 20 comprises a standard screen 21 and keypad 22 but further incorporates additional function keys 23 to aid the construction of a particular Arrangement 10.

Therefore, instead of the various segments of the keypad 22 being mapped onto specific notes by the software in the CPU of the mobile phone 20, the function keys 23 on the phone handset will be mapped onto specific sounds, notes or objects stored within the mobile phone. Again a range of sounds may be used, from conventional musical sounds with information relating to the pitch rhythmic value and timbre of the note, to fragments of drum grooves, or other non-musical sounds. Indeed as above, the notes may refer to harmonic structures, such as triads, chords, scales or modes, whereby the user can create a sequence of such structures in relation to a background rhythmic structure.

Within the mobile phone environment the priority would be for ease-of-use for a particular user. Therefore, the standard process for mobile phone compositions would be for the user to enter the compositional process at the Ideas 6 to Phrases 8 stage. Therefore the note set 2, Ideas 6 and Song Form Templates 1 are typically preset by the software into certain musical styles e.g. Drum 'n' Bass Drum Groove Generator, Jig and Reel Generator. Thus, once the user has employed the function keys 23 to order a sequence of Ideas 6 into a Phrase 8, they can hear the end result at a Song Form Template 1 stage, as the Notes, Ideas 6, and Song Form Templates 1 are pre-set.

However, within a particular a power-user mode, the user could gain access to pre-set menus in order to select a particular note set 2 to choose from. As previously described the user can then build Ideas 6 from the note set 2, Phrases 8 from the Ideas 6 and thereafter order the Phrases 8 into a Song Form Template 1. Within this power-user mode the user has control over the whole creative process.

In an alternative embodiment (not shown) the mobile phones could be physically connected, or via infra red signals, so as to permit the concept of competition between two users performing the same Arrangement to be carried out within the mobile phone environment.

Employing the methods outlined above offer the significant advantages that they allow a user to see how a musical piece is constructed out of its component parts. Employing the either the keyboards 14 and 18 or the mobile phone 20 with their related software allows the user to learn about music and improve their ability to play a keyboard instruments.

A further advantage of aspects of the present invention is that it provides a method that allows a user to construct musical Arrangement from fundamental building blocks. As the user's experience grows the concepts of pitch, rhythm and harmonies can be introduced to increase the users understanding and skill. Such increases in skill and understanding helps in the creation of a sense of achievement and ownership associated with composing your own music. In addition, by composing their own Arrangements a user can also produce a wide range of material with which they can enhance their ability to perform a composition. Users can also learn as they create. Therefore, the described methods provides an environment that allows supported creativity, whereby a user follows a supported sequence of tasks which guide their creativity. At all times users are genuinely involved in the decision-making process, so they can learn to understand musical and compositional principles demonstrated in compositions they themselves have written.

A yet further advantage of an aspect of the present invention is that it provides a musical keyboard that connects directly to a computer via a standard keyboard connection means.

Another advantage of the present invention is that it provides a means for quantifying a user's ability to reproduce a predetermined musical Arrangement.

Aspects of the present invention have the further advantage that they offers a facility for more than one user to try and reproduce a predetermined information template.

Further modifications and improvements may be added without departing from the scope of the invention as defined by the accompanying claims.

The invention claimed is:

1. A method for constructing a musical composition, the method comprising the steps of:
   (a) providing a computer interface device adapted for musical note input, and connecting said device to a computer programmed to recognise the musical note input;
   (b) constructing an idea set from a note set using the musical note input interface device, and storing the idea set in said computer;
   (c) constructing a phrase set from the idea set using the computer interface device, and storing the phrase set in said computer;
   (d) constructing a song form template from the phrase set using the computer interface device, and storing the song form template in said computer;
   (e) choosing a number of repetitions of the song form template using the computer interface device;
   (f) combining said number of repetitions together so as to construct the musical composition; and
   (g) displaying the musical composition on a monitor connected to the computer.

2. A method for constructing a musical composition according to claim 1 wherein the note set comprises a predetermined number of notes chosen from a group comprising conventional musical notes with a rhythmic and pitch component, purely rhythmic sub-units, words, animal noises, a rest and harmonic structures.

3. A method for constructing a musical composition according to claim 1 wherein the idea set comprises a number of ideas, each idea comprising an ordered sequences of notes selected from the note set.

4. A method for constructing a musical composition according to claim 1 wherein the phrase set comprises a number of phrases, each phrase comprising an ordered sequences of ideas selected from the idea set.

5. A method for constructing a musical composition according to claim 1 wherein the song form template comprises an ordered sequences of phrases selected from the phrase set.

6. A method for constructing a musical composition according to claim 1 wherein the song form template further comprises a background harmonic structure onto which the ideas and phrases are mapped.

7. A method for constructing a musical composition according to claim 1 wherein variation is introduced to the song form template by changing the pitch of part or all of an idea and thereafter substituting the altered idea within the song form template.

8. A method for constructing a musical composition according to claim 1 wherein variation is introduced to the song form template by changing the rhythm of part or all of an idea and thereafter substituting the altered idea within the song form template.

9. A method for constructing a musical composition according to claim 1 wherein variation is introduced to the song form template by changing both the rhythm and pitch of part or all of an idea and thereafter substituting the altered idea within the song form template.

10. A method for constructing a musical composition according to claim 1 wherein variation is introduced to the song form template in the form of resolution by substituting the altered idea at the end of a phrase.

11. A method for constructing a musical composition according to claim 1 wherein pitch is introduced to the song form template by allocating relative pitch to the musical notes or harmonic structures within the note set whereby on mapping the phrases onto the background harmonic structure the relative pitch is converted to actual pitch.

12. A method for constructing a musical composition according to claim 1 wherein pitch is introduced to the song form template by allocating relative pitch to the ideas within the idea set whereby on mapping the phrases onto the background harmonic structure the relative pitch is converted to actual pitch.

13. A method for constructing a musical composition according to claim 1 wherein pitch is introduced to the song form template by allocating relative pitch to the phrases within the phrase set wherein on mapping the phrases onto the background harmonic structure the relative pitch is converted to actual pitch.

14. A method for constructing a musical composition according to claim 1 wherein the musical composition further comprises a melodic composition for use as a bass line.

15. A method for constructing a musical composition according to claim 1 wherein the musical composition further comprises a melodic composition for use as a counter point.

16. A method for constructing a musical composition according to claim 1 wherein the musical composition further comprises a melodic composition for use as a harmony part.

17. A method for constructing a musical composition according to claim 1 wherein the musical composition further comprises a melodic composition for use as a drum part.

18. A method for constructing a musical composition according to any one of claims 14, 15, or 16 wherein the melodic composition comprises a separate song form template.

19. A method for constructing a musical composition according to claim 1 wherein the song form template further comprises an introduction.

20. A method for constructing a musical composition according to claim 1 wherein the song form template further comprises an interlude.

\* \* \* \* \*